United States Patent
Wang et al.

(10) Patent No.: US 8,908,306 B1
(45) Date of Patent: Dec. 9, 2014

(54) DISK DRIVE MEASURING CHANNEL TRANSITION RESPONSE BY AVERAGING ISOLATED TRANSITIONS IN A READ SIGNAL

(71) Applicant: Western Digital Technologies, Inc., Irvine, CA (US)

(72) Inventors: Alvin J. Wang, Fremont, CA (US); Khoa Xuan Bui, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/840,513

(22) Filed: Mar. 15, 2013

(51) Int. Cl.
  *G11B 20/10* (2006.01)
  *G11B 5/09* (2006.01)
  *G11B 27/36* (2006.01)
  *G11B 21/02* (2006.01)

(52) U.S. Cl.
  CPC ..................... *G11B 20/10* (2013.01)
  USPC ..................... 360/39; 31/46; 31/75

(58) Field of Classification Search
  None
  See application file for complete search history.

(56) References Cited

U.S. PATENT DOCUMENTS

| | | | |
|---|---|---|---|
| 6,366,417 B1 | 4/2002 | Mathews et al. | |
| 6,611,390 B1 | 8/2003 | Egan | |
| 7,199,961 B1 | 4/2007 | Wu et al. | |
| 7,411,754 B2 | 8/2008 | Wang et al. | |
| 8,116,024 B2 * | 2/2012 | Erden | 360/51 |
| 8,149,529 B2 | 4/2012 | Mathew et al. | |
| 8,154,818 B2 | 4/2012 | Mathew et al. | |
| 2006/0259263 A1 * | 11/2006 | Ashley et al. | 702/107 |
| 2013/0021690 A1 * | 1/2013 | Xia et al. | 360/51 |

* cited by examiner

*Primary Examiner* — Regina N Holder

(57) ABSTRACT

A disk drive is disclosed comprising a head actuated over a disk, and control circuitry operable to measure a transition response of the disk drive. A test pattern is written to the disk in order to write a plurality of substantially isolated magnetic transitions on the disk. The test pattern is read from the disk to generate a read signal, and the read signal is sampled to generate signal samples. A first plurality of the signal samples is extracted representing a first magnetic transition, and a second plurality of the signal samples is extracted representing a second magnetic transition. A transition response of the disk drive is measured in response to the first and second plurality of signal samples.

19 Claims, 6 Drawing Sheets

FIG. 3A

FIG. 3B  AVERAGE-INVERT-SCALE

FIG. 4B  AVERAGE-INVERT-SCALE

DISK DRIVE MEASURING CHANNEL TRANSITION RESPONSE BY AVERAGING ISOLATED TRANSITIONS IN A READ SIGNAL

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Data is typically recorded onto the disk surface by modulating a write current of an inductive write coil to generate a recording flux that magnetizes the magnetic medium to saturation. In longitudinal magnetic recording, the magnetic flux magnetizes the magnetic medium in an in-plane orientation (left or right) with respect to the disk surface, and in perpendicular magnetic recording, the magnetic flux magnetizes the magnetic medium in a perpendicular orientation (up or down) with respect to the disk surface. Disk drives may employ a Non Return to Zero (NRZ) modulation scheme wherein a "1" bit is recorded with a positive recording flux, and a "0" bit is recorded with a negative recording flux (or vise versa). During a read operation, a read element (e.g., a magnetoresistive element) senses the magnetic field emanating from the disk surface generated by the recorded data. The resulting read signal can be regarded as a superposition of the isolated transition responses at the linear bit positions.

DETAILED DESCRIPTION

It may be desirable to measure the transition response of the recording channel, for example, to determine the PW50 defined as the pulse width at 50 percent amplitude of the transition response for longitudinal magnetic recording, or to determine the T50 defined as the time for the transition response to change from $-A/2$ to $A/2$ for perpendicular magnetic recording. It may also be desirable to measure the linear density (channel bit density) at a given data rate (bit cell period T) which may be defined as the PW50/T or T50/T. The transition response may provide an indication of the quality of certain components, such as the coercivity of the magnetic medium, the strength of the recording flux, and/or the sensitivity of the read element. The transition response may also be used to calibrate certain components, such as calibrating the target response of an equalizer, or calibrating a fly height of the head above the disk.

Figure 1A:
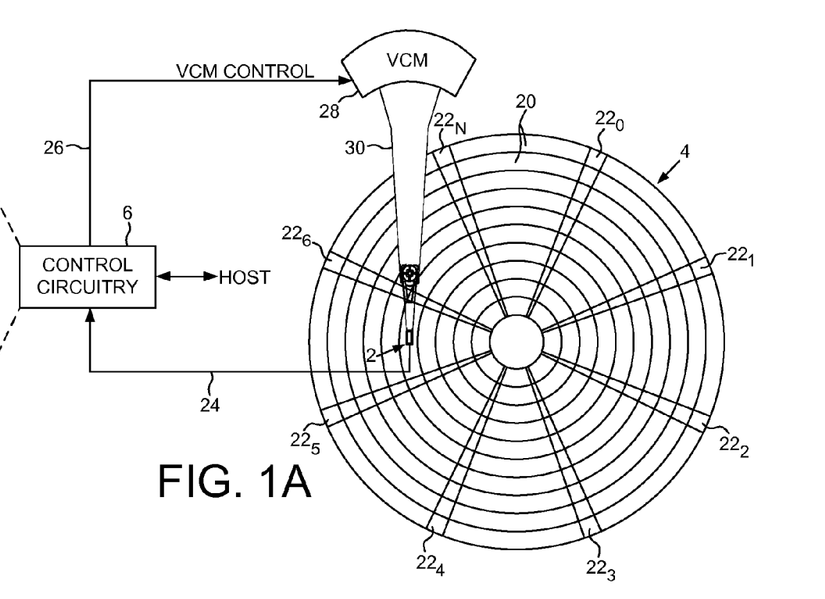
FIG. 1A shows a disk drive according to an embodiment comprising a head actuated over a disk.
Figure 1B:
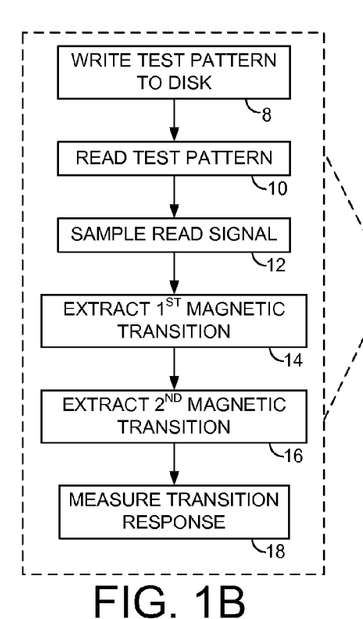
FIG. 1B is a flow diagram according to an embodiment wherein a test pattern is written to and read from the disk, the read signal is sampled, and the signal samples representing the magnetic transitions on the disk are evaluated to measure a transition response of the disk drive.

FIG. 1A shows a disk drive according to an embodiment comprising a head 2 actuated over a disk 4, and control circuitry 6 operable to measure a transition response of the disk drive by executing the flow diagram of FIG. 1B. A test pattern is written to the disk in order to write a plurality of substantially isolated magnetic transitions on the disk (block 8). The test pattern is read from the disk to generate a read signal (block 10), and the read signal is sampled to generate signal samples (block 12). A first plurality of the signal samples is extracted representing a first magnetic transition (block 14), and a second plurality of the signal samples is extracted representing a second magnetic transition (block 16). A transition response of the disk drive is measured in response to the first and second plurality of signal samples (block 18).

In the embodiment of FIG. 1A, the disk 4 comprises a plurality of servo tracks 20 defined by servo sectors $22_0$-$22_N$, wherein data tracks are defined relative to the servo tracks at the same or different radial density. The control circuitry 6 processes a read signal 24 emanating from the head 2 to demodulate the servo sectors $22_0$-$22_N$ and generate a position error signal (PES) representing an error between the actual position of the head and a target position relative to a target track. The control circuitry 6 filters the PES using a suitable compensation filter to generate a control signal 26 applied to a voice coil motor (VCM) 28 which rotates an actuator arm 30 about a pivot in order to actuate the head 2 radially over the disk 4 in a direction that reduces the PES. The servo sectors $22_0$-$22_N$ may comprise any suitable head position information, such as a track address for coarse positioning and servo bursts for fine positioning. The servo bursts may comprise any suitable pattern, such as an amplitude based servo pattern or a phase based servo pattern.

In one embodiment, the control circuitry 6 positions the head 2 over a target data track in response to the servo sectors $22_0$-$22_N$ prior to writing/reading the test pattern. In addition, in some embodiments the control circuitry 6 may position the head 2 over multiple different data tracks at different radial locations in order to measure a transition response at each radial location, and then average the measured transition responses to measure an overall transition response for the disk drive. In one embodiment, the control circuitry 6 may transmit the measured transition response to a host, such as in a Self-Monitoring Analysis and Reporting Technology (SMART) log. In one embodiment, the control circuitry 6 may store the transition response measured at each radial location, as well as an average transition response in the SMART log. In yet another embodiment, the control circuitry 6 may measure the transition response periodically over the life of the disk drive, wherein a history of the transition response may be stored in the SMART log. The history of transition response may be evaluated by a disk drive manufacturer to evaluate degradation of various components (e.g., the disk, head, etc.) and make appropriate improvements to the manufacturing processes. In another embodiment, the control circuitry 6 within the disk drive may evaluate the history of the transition response in order to predict failure of one or more components while the disk drive is deployed in the field. In yet another embodiment, the measured transition response may be used to calibrate certain components, such as calibrating the target response of an equalizer, or calibrating a fly height of the head above the disk.

In one embodiment, the measured transition response may be used by the control circuitry 6 in order to format the linear density (bits per inch (BPI)) of the disk 4. That is, the transition response provides a measure of transition spacing, and therefore the measured transition response may be used to select the linear density that provides maximum density at a minimal error rate. In one embodiment, the disk may be partitioned into a number of data zones, where each data zone comprises a plurality of contiguous data tracks. The transition response may be measured for each data zone in order to select a linear bit density for each data zone when formatting the disk.

Figure 1C:
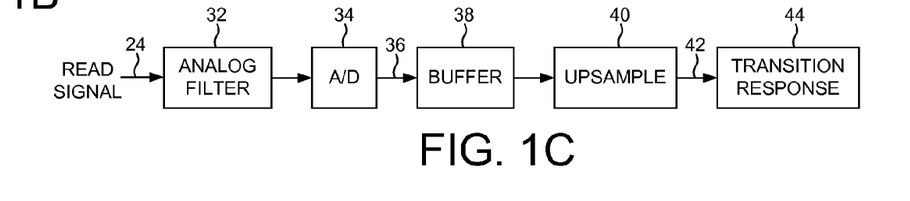
FIG. 1C shows control circuitry according to an embodiment comprising an analog filter operable to filter the read signal prior to sampling, and an upsampler for sampling the signal samples in order to measure the transition response of the disk drive.

FIG. 1C shows control circuitry according to an embodiment comprising an analog filter 32 (e.g., low pass filter) operable to filter the read signal 24 prior to sampling 34 the read signal to generate the signal samples 36. The signal samples 36 are buffered 38, and the buffered signal samples are upsampled 40 to generate upsampled signal samples 42. The upsampled signal samples 42 representing the magnetic transitions in the read signal are extracted and averaged in order to measure the transition response 44 for the disk drive.

Figure 2A:
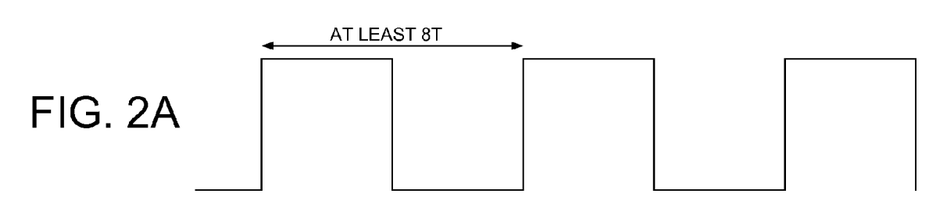
FIG. 2A shows an embodiment wherein the test pattern written to the disk comprises a periodic pattern having a period of at least eight T.
Figure 2B:
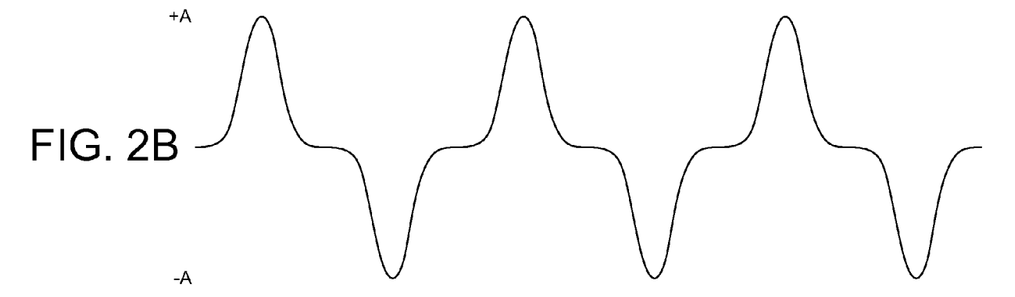
FIG. 2B shows a read signal generated when reading the test pattern that is written to the disk using longitudinal magnetic recording according to an embodiment.
Figure 2C:
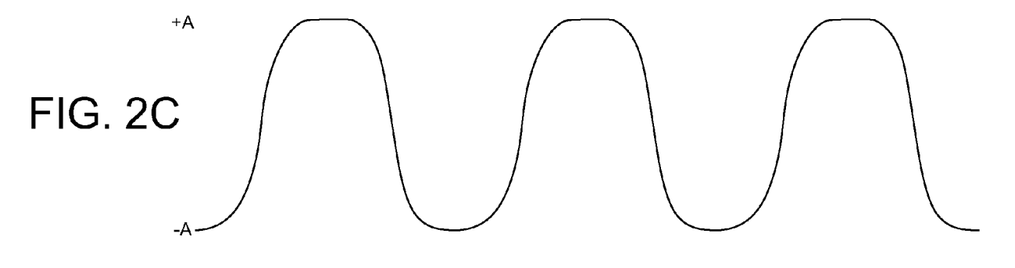
FIG. 2C shows a read signal generated when reading the test pattern that is written to the disk using perpendicular magnetic recording according to an embodiment.

FIG. 2A shows an embodiment wherein the pattern written to the disk comprises a periodic pattern (square wave) representing a non-return to zero (NRZ) sequence of bits written to the disk (++++−−−−++++−−−− . . . ). In one embodiment, the periodic pattern comprises a period of at least 8T so that the resulting transitions in the read signal are substantially isolated (e.g., little or no intersymbol interference). FIG. 2B shows a read signal generated when reading a test pattern written using longitudinal magnetic recording. The read signal is shown in FIG. 2B as a continuous read signal, but in practice the signal samples representing the read signal are processed to measure the transition response. In an embodiment described below, the signal samples may be upsampled so that the resulting upsampled signal samples are a better representation of the analog read signal, and therefore provide a better measurement of the transition response. FIG. 2C shows a read signal generated when reading a test pattern written using perpendicular magnetic recording. In one embodiment, the derivative of the read signal shown in FIG. 2C may be computed in order to generate a transition response similar to that shown in FIG. 2B for a perpendicularly recorded test pattern.

Figure 3A:
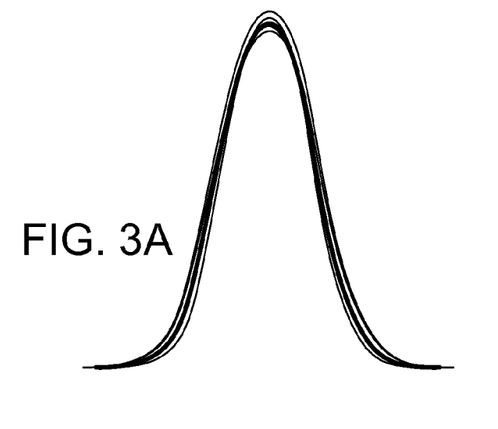
FIGS. 3A-3C show an embodiment wherein the signal samples representing multiple transitions of a longitudinally magnetic pattern are averaged in order to measure the transition response of the disk drive.
Figure 3B:
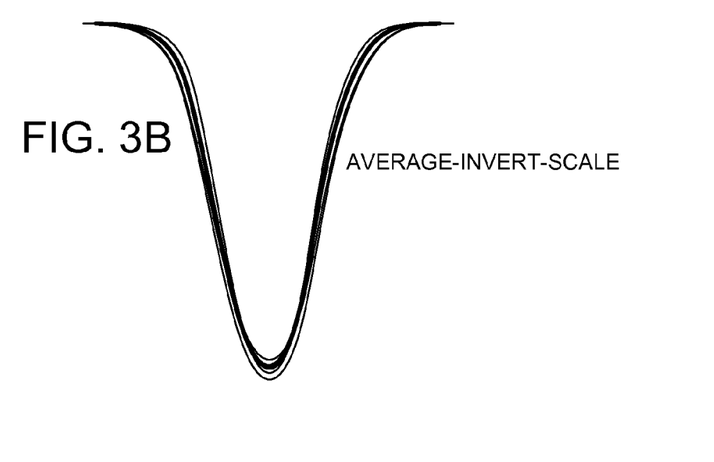
Figure 3C:
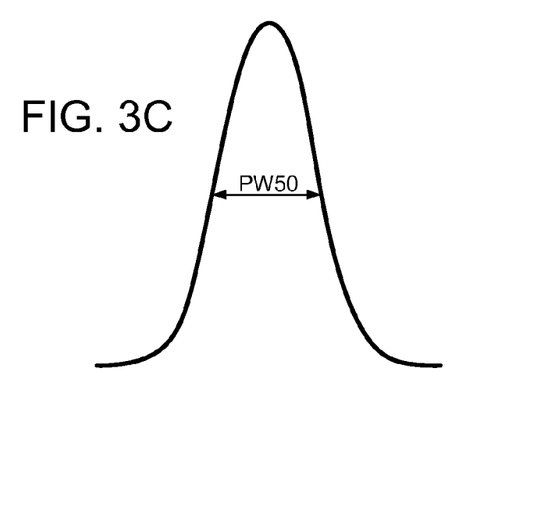

FIGS. 3A-3C show an embodiment wherein the signal samples representing multiple positive magnetic transitions and multiple negative magnetic transitions are extracted, aligned, and averaged in order to generate an average positive transition (FIG. 3A) and an average negative transition (FIG. 3B). The signal samples representing the isolated transitions may be aligned using any suitable technique, such as by aligning the signal samples based on the zero crossing of each transition. In another embodiment, the signal samples representing the transitions may be aligned by shifting the signal samples until a correlation between the signal samples reaches a maximum. In an embodiment described below, the average negative transition shown in FIG. 3B may be inverted and scaled to compensate for a non-linear effect of the head 2. The averaged, inverted and/or scaled negative transition may then be averaged with the averaged positive transition in order to generate the measured transition response shown in FIG. 3C. In one embodiment, a PW50 may be measured based on the measured transition response as shown in FIG. 3C, wherein the measured PW50 may be stored in the SMART log together with, or instead of, storing the measured transition response.

Figure 4A:
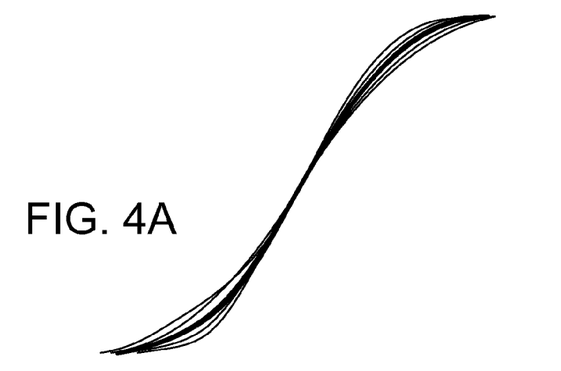
FIGS. 4A-4C show an embodiment wherein the signal samples representing multiple transitions of a perpendicularly magnetic pattern are averaged in order to measure the transition response of the disk drive.
Figure 4B:
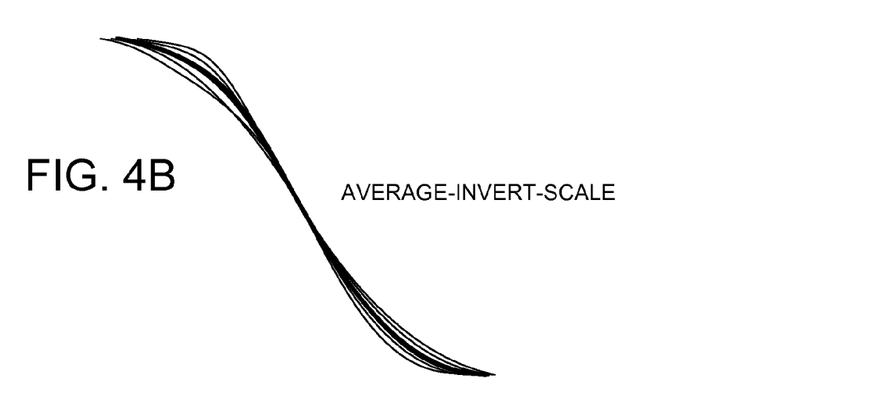
Figure 4C:
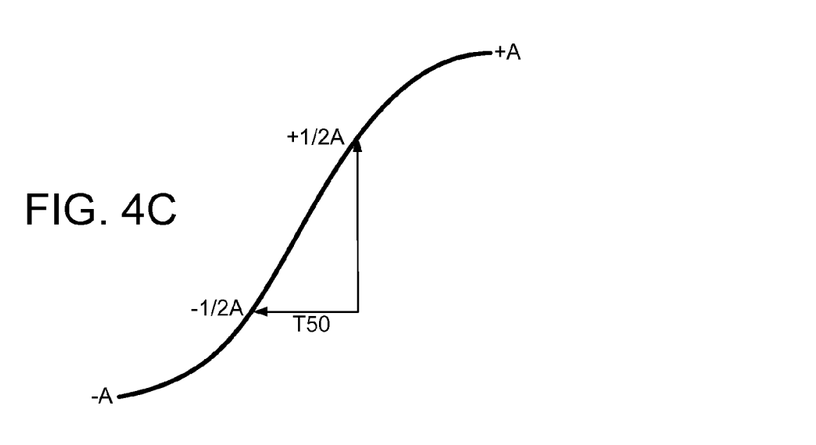

In the embodiment of FIGS. 3A-3C, the transition responses may be generated by reading a test pattern written using longitudinal magnetic recording, or by taking the derivative of the read signal after reading a test pattern written using perpendicular magnetic recording. FIGS. 4A-4C show an embodiment wherein transitions are generated by reading a test pattern written using perpendicular magnetic recording. The signal samples representing multiple positive magnetic transitions and multiple negative magnetic transitions are extracted, aligned, and averaged in order to generate an average positive transition (FIG. 4A) and an average negative transition (FIG. 4B). Similar to the embodiment described above, the average negative transition shown in FIG. 4B may be inverted and scaled to compensate for a non-linear effect of the head 2. The averaged, inverted and scaled negative transition may then be averaged with the averaged positive transition in order to generate the measured transition response shown in FIG. 4C. In one embodiment, a T50 may be measured based on the measured transition response as shown in FIG. 4C, wherein the measured T50 may be stored in the SMART log together with, or instead of, storing the measured transition response.

Figure 5:
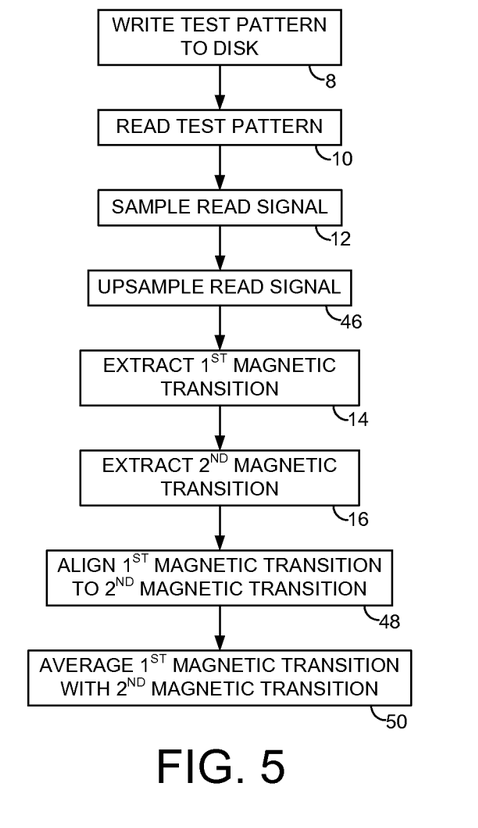
FIG. 5 is a flow diagram according to an embodiment wherein the signal samples are upsampled, and the upsampled signal samples representing multiple magnetic transitions are aligned and averaged in order to measure the transition response of the disk drive.

FIG. 5 is a flow diagram according to an embodiment that expands on the flow diagram of FIG. 1B, wherein the signal samples are upsampled (block 46), and the upsampled signal samples representing the magnetic transitions are extracted. Upsampling the signal samples may improve the resolution of the represented transitions, and therefore may improve the measured transition response of the disk drive. Upsampling the signal samples may be performed in any suitable manner, such as by generating interpolated signal samples between the actual signal samples. In the embodiment of FIG. 5, the upsampled signal samples representing the magnetic transitions are aligned (block 48) using any suitable technique (e.g., align relative to zero crossings or align toward maximum correlation), and then the aligned, upsampled signal samples are averaged into an overall transition response of the disk drive (block 50).

Figure 6:
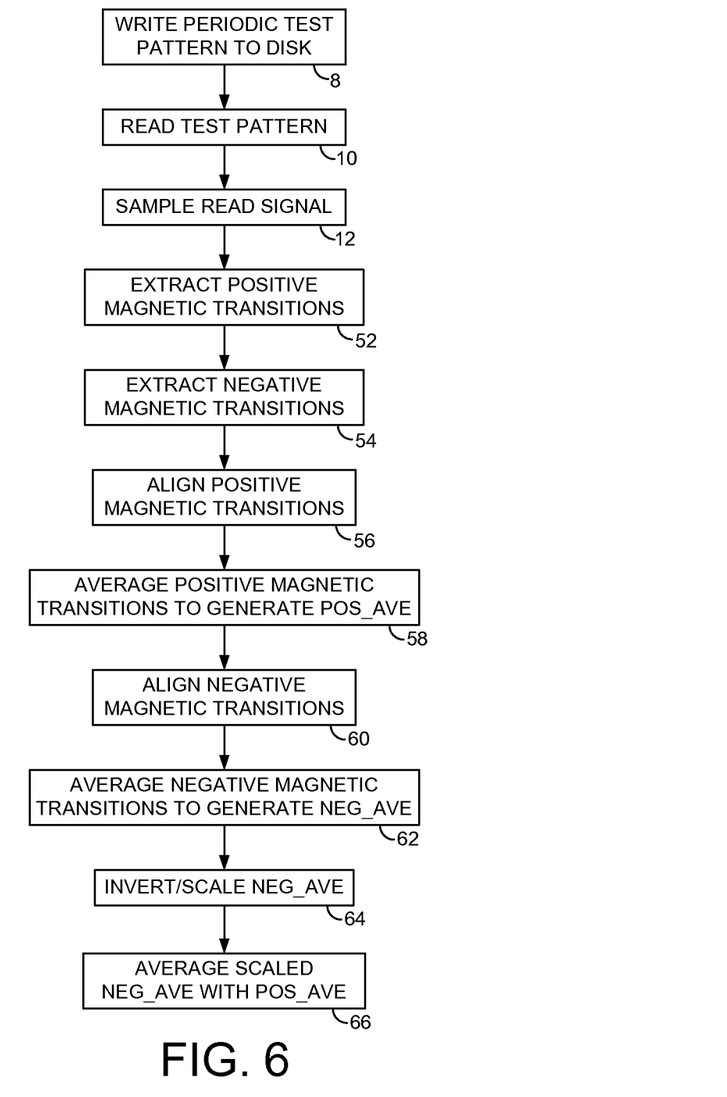
FIG. 6 is a flow diagram according to an embodiment wherein the signal samples of the negative magnetic transitions are averaged, inverted, and scaled and then added to the average positive magnetic transition in order to measure the transition response of the disk drive.

FIG. 6 is a flow diagram that expands on the flow diagram of FIG. 1B, wherein the signal samples are processed to extract the positive magnetic transitions (block 52) and processed to extract the negative magnetic transitions (block 54). The signal samples representing the positive magnetic transitions are aligned (block 56), and the signal samples are averaged to generate an averaged positive transition POS_AVE (block 58) such as shown in FIG. 4A. The signal samples representing the negative magnetic transitions are aligned (block 60), and the signal samples are averaged to generate an averaged negative transition NEG_AVE (block 62) such as shown in FIG. 4B. The NEG_AVE is inverted and scaled (block 64) to compensate for a non-linear effect of the head 2. The scaled NEG_AVE is then averaged with the POS_AVE (block 66) to generate the measured transition response for the disk drive such as shown in FIG. 4C.

In one embodiment, the non-linear effect of the head 2 is caused by a non-linear response of the read element to positive and negative magnetic transitions, thereby resulting in an amplitude asymmetry where the amplitude of the negative transitions may be less than the amplitude of the positive transitions. This amplitude asymmetry may be estimated using any suitable technique, such as by computing a single frequency discrete Fourier transform (DFT) for each of the positive transition sequence and the negative transition sequence. In another embodiment, the amplitude asymmetry may be estimated by comparing the amplitude of the average positive transition (e.g., FIG. 4A) to the amplitude of the average negative transition (e.g., FIG. 4B). The estimated amplitude asymmetry may then be used to scale the amplitude of the average negative transition before being averaged with the average positive transition to generate the measured transition response of the disk drive. Alternatively, the amplitude of the average positive transition may be scaled before being averaged with the average negative transition to generate the measured transition response for the disk drive. In yet another embodiment, the transition response of the disk drive may be measured by evaluating only the positive transitions or only the negative transitions in the read signal, thereby obviating the effect of amplitude asymmetry.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A disk drive comprising:
   a disk;
   a head actuated over the disk; and
   control circuitry operable to:
     write a test pattern to the disk in order to write a plurality of substantially isolated magnetic transitions on the disk;
     read the test pattern from the disk to generate a read signal;
     sample the read signal to generate signal samples;
     extract a first plurality of the signal samples representing a first magnetic transition;
     extract a second plurality of the signal samples representing a second magnetic transition; and
     measure a transition response of the disk drive in response to the first and second plurality of signal samples.

2. The disk drive as recited in claim 1, wherein the control circuitry is further operable to measure the transition response of the disk drive by averaging the first and second plurality of signal samples.

3. The disk drive as recited in claim 2, wherein the control circuitry is further operable to align the first plurality of signal samples to the second plurality of signal samples prior to averaging the first and second plurality of signal samples.

4. The disk drive as recited in claim 1, wherein the test pattern comprises a periodic pattern resulting in a periodic pattern of isolated magnetic transitions on the disk.

5. The disk drive as recited in claim 4, wherein the test pattern comprises a periodic pattern having a period of at least eight T, where 1/T represents a data rate of the test pattern.

6. The disk drive as recited in claim 4, wherein the periodic pattern of isolated magnetic transitions alternate in polarity.

7. The disk drive as recited in claim 6, wherein the first plurality of signal samples represents a positive magnetic transition and the second plurality of signal samples represents a negative magnetic transition.

8. The disk drive as recited in claim 7, wherein the control circuitry is further operable to:
   scale at least one of the first and second plurality of signal samples to generate scaled signal samples; and
   measure the transition response of the disk drive in response to the scaled signal samples.

9. The disk drive as recited in claim 8, wherein the scaling compensates for a non-linear effect of the head.

10. A method of operating a disk drive comprising a head actuated over a disk, the method comprising:
- writing a test pattern to the disk in order to write a plurality of substantially isolated magnetic transitions on the disk;
- reading the test pattern from the disk to generate a read signal;
- sampling the read signal to generate signal samples;
- extracting a first plurality of the signal samples representing a first magnetic transition;
- extracting a second plurality of the signal samples representing a second magnetic transition; and
- measuring a transition response of the disk drive in response to the first and second plurality of signal samples.

11. The method as recited in claim 10, further comprising measuring the transition response of the disk drive by averaging the first and second plurality of signal samples.

12. The method as recited in claim 11, further comprising aligning the first plurality of signal samples to the second plurality of signal samples prior to averaging the first and second plurality of signal samples.

13. The method as recited in claim 10, wherein the test pattern comprises a periodic pattern resulting in a periodic pattern of isolated magnetic transitions on the disk.

14. The method as recited in claim 13, wherein the test pattern comprises a periodic pattern having a period of at least eight T, where 1/T represents a data rate of the test pattern.

15. The method as recited in claim 13, wherein the periodic pattern of isolated magnetic transitions alternate in polarity.

16. The method as recited in claim 15, wherein the first plurality of signal samples represents a positive magnetic transition and the second plurality of signal samples represents a negative magnetic transition.

17. The method as recited in claim 16, further comprising:
- scaling at least one of the first and second plurality of signal samples to generate scaled signal samples; and
- measuring the transition response of the disk drive in response to the scaled signal samples.

18. The method as recited in claim 17, wherein the scaling compensates for a non-linear effect of the head.

19. A disk drive comprising:
- a disk;
- a head actuated over the disk; and
- control circuitry operable to:
  - write a test pattern to the disk in order to write a plurality of substantially isolated magnetic transitions on the disk;
  - read the test pattern from the disk to generate a read signal;
  - sample the read signal to generate signal samples;
  - upsample the signal samples to generate upsampled signal samples;
  - extract a first plurality of the upsampled signal samples representing a first magnetic transition;
  - extract a second plurality of the upsampled signal samples representing a second magnetic transition; and
  - measure a transition response of the disk drive in response to the first and second plurality of upsampled signal samples.

* * * * *